July 8, 1969 GERHARD-GÜNTER GASSMANN 3,454,710

SYNCHRONOUS DEMODULATOR SYSTEM

Filed Nov. 8, 1965 Sheet 1 of 3

INVENTOR
GERHARD-GUNTER GASSMANN

BY Percy P. Lantzy

ATTORNEY

INVENTOR
GERHARD-GUNTER GASSMANN

BY Percy P. Lantzy

ATTORNEY

INVENTOR
GERHARD-GUNTER GASSMANN
BY Percy P. Lantzy
ATTORNEY

United States Patent Office 3,454,710

Patented July 8, 1969

3,454,710

SYNCHRONOUS DEMODULATOR SYSTEM

Gerhard-Günter Gassmann, Berkheim, Germany, assignor to International Standard Electric Corporation, New York, N.Y., a corporation of Delaware Filed Nov. 8, 1965, Ser. No. 506,647
Claims priority, application Germany, Nov. 10, 1964, St 22,923, St 22,924; Nov. 11, 1964, St 22,927
Int. Cl. H04n 7/04, 7/06, 5/60
U.S. Cl. 178—5.8 15 Claims

ABSTRACT OF THE DISCLOSURE

A system and method for signal reception wherein the incoming signal is demodulated in a demodulator by a locally generated signal of the same frequency and phase as the carrier of the incoming signal, said locally generated signal in turn being modulated by a locally generated auxiliary signal. The output of the demodulator is filtered to recover the remnant auxiliary signal which is in turn compared with the original auxiliary signal to provide a control signal for controlling the aforesaid locally generated signal.

Figure 1:
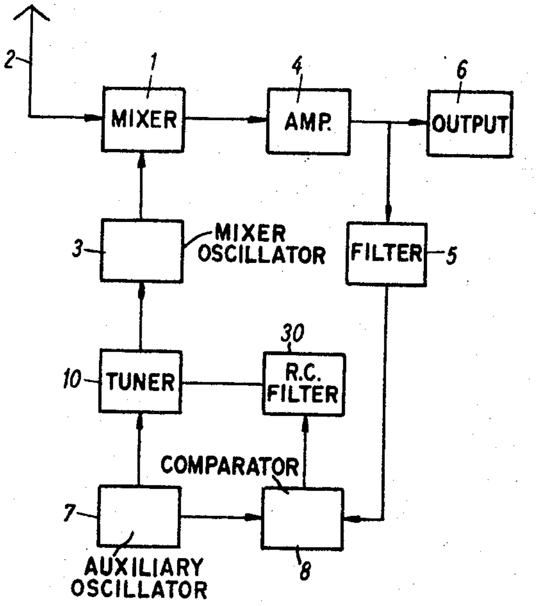

The invention relates to a method for receiving radio frequency signals in which the received signal is led to an amplifier (e.g. a low-frequency or video amplifier) via at least a mixer with mixer oscillator, and in which, at correct tuning, the frequency of the mixer oscillator is equal to the carrier frequency of the received signal. This method is known as a synchrodyne method. An essential problem in this method is synchronization of the mixer oscillator. The voltage of said mixer oscillator must be synchronous in frequency as well as in phase with the carrier frequency of the received signal. The follow-up synchronization of an oscillator demands that the amplitude of said follow-up signal is not essentially smaller than, e.g., ten times smaller than the voltage of the mixer oscillator. Since, in general, the amplitude of the received signal is, however, essentially smaller (e.g. microvolts or millivolts), hitherto a wide-band preamplifier was required, preceding the synchrodyne receiver as a multiplicative demodulator. This method, however, shows considerable disadvantages so that this method was never used practically in the production process. For example, a crossmodulation can occur between two different signals, moreover the expenditure is relatively high.

It is the object of the invention to provide a method possessing the advantages of the synchrodyne method but which requires only a non-amplified or a little amplified receiving signal prior to the multiplicative demodulation, so that the essential portion of the amplification is made in an amplifier, succeeding the frequency mixer.

According to the invention this is achieved in a method, in which the received signal is led to an amplifier (e.g. a low-frequency amplifier or video amplifier) via at least one mixer with mixer oscillator, and in which, at correct tuning, the frequency of the mixer oscillator is equal to the carrier frequency of the received signal, wherein the received signal or the mixer oscillator is modulated with an auxiliary signal, which is compared, in order to produce a control voltage for precision tuning of the frequency and/or the phase of the mixer oscillator, in a comparison circuit with the auxiliary signal, derived from the amplifier.

The method according to the invention shows the advantage that the essential amplification of the receiver is made in the amplifier, following the mixer, at considerably lower frequencies. Said amplifier is a low-frequency amplifier, as far as the reception of audio-frequencies is concerned, e.g. broadcasting. If video signals shall be received a wide-band video amplifier is utilized. By this method an intermediate frequency amplifier with a plurality of oscillating circuits is avoided so that modern, automatically produceable, circuits can be used (e.g. thin film technique or solid integrated circuits).

Moreover, the method according to the invention shows the advantage that the considerable work for balancing an intermediate frequency amplifier is avoided.

Finally, the gain control of a transistorized low-frequency amplifier and/or video amplifier is considerably simpler than the gain control of a selective intermediate frequency amplifier, particularly an intermediate frequency amplifier for television, because no deformation of the passing curve occurs. Therefore it is also possible to approach the theoretically optimum amplification and to use an essentially smaller amplification than for intermediate frequency amplifiers with regard to the deformation of the passing curve.

When receiving television signals the difference frequency for the audio-signal already exists in the mixer, along with the video signal. Therefore, no mixing between video carrier and audio-carrier is made so that the intercarrier method is not applied and the audio-reception is not interfered by the intercarrier hum.

The disadvantage of the parallel audio-method which allows setting, if weak signals are received, either an optimum video reception without audio or vice versa, does not occur when utilizing the method provided by the invention.

The invention and its advantages will now be explained in detail with the aid of examples and the accompanying drawings.

The method according to the invention will be explained with the aid of FIG. 1. 1 represents the mixer to which the receiving signal is led from the antenna 2; 3 shows the mixer oscillator to be synchronized; 4 represents the amplifier (e.g. low-frequency amplifier or video amplifier), following the mixer; 5 is a filter from which the auxiliary signal, leaving the amplifier 4 is derived; 6 is the final signal received (e.g. a loudspeaker or a television tube); 7 is the auxiliary oscillator, producing the auxiliary signal; 8 is the comparing circuit to which the auxiliary signal arriving from the oscillator 7 is led. A control voltage is derived from the comparing circuit 8, said voltage being filtered with the R/C filtering element 30 and which precision-tunes the mixer oscillator 3 with the aid of the tuning facility 10. For phase modulation of the mixer oscillator 3 the tuning facility 10 in addition receives the auxiliary signal from the oscillator 7.

The double super-principle may also be used. The mixer 1 is thereby the "second mixer." The signal led to the mixer 1 does not arrive from the antenna, but from the preceding "first mixer." This is of particular advantage when, as it is the case for television receivers, with regard to the interfering radiation suppression of the first oscillator, belonging to the first mixer that said oscillator must have a sufficient spacing from the received signal.

Figure 2:
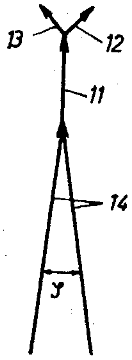

FIG. 2 shows the voltages led to the mixer 1. 11 represents the carrier of the received signal, 12 and 13 represent the side-band frequencies of the received signal in that case that there with a single low-frequency the amplitude-modulation is carried out. 14 shows the voltage with a phase-shift arriving from the oscillator 3 in both extreme positions.

Figure 3:
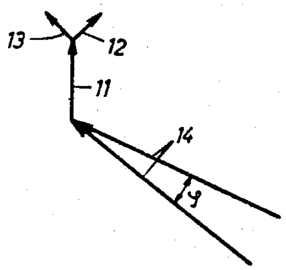

In the phase position desired as shown in FIG. 2 there occurs the two the voltage 14 of the oscillator 3 and the signal carrier 11 practically no, or a negligibly small amplitude of voltage with the frequency of the phase modulation, so that the interference of the actual signal is so small that it can be neglected. If, however, the phase position deviates, e.g. towards the right, as shown in FIG. 3, a voltage appears at the output of the mixer and, consequently, at the output of the amplifier 4, said voltage having the frequency of the phase modulation. This voltage is, depending on the direction of the phase deviation, either equal-phased or counter-phased compared with the voltage of the auxiliary generator 7. Depending on whether said voltage is equal-phased or counter-phased the control voltage, produced by the comparing circuit 8 is either positive or negative in relation to the reference value of the control voltage (e.g. 0 volt), occurring at the correct phase position.

Also if non-modulated signals are received as it is the case for example in the orientation bearing of satellites, based on the Doppler principle, it is of advantage to apply the method according to the invention, because only the bandwidth of the synchronizing control circuit for the synchronizing capability is of importance so that signals can be received which are extremely noise-disturbed, whereby the frequency of the oscillator contains the information required for the orientation bearing.

For phase-modulated receiving signals it is proposed according to the invention to modulate the oscillator 3 or the received signal itself with the auxiliary signal. Thereby, at a correct phase position, the interference between the received signal and the auxiliary signal is negligibly small. Between the amplifier 4 and the signal output 6 a phase demodulator or a demodulator for frequency-modulation, is inserted from which the auxiliary signal is derived with the aid of the filter 5.

If the oscillator is amplitude-modulated the average oscillator amplitude must be selected small so that this amplitude modulation appears in the succeeding low-frequency signal and/or video-signal.

Figure 4:
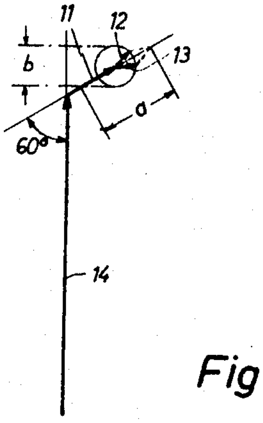

Hitherto only signals with a pure amplitude modulation or a pure phase modulation were considered. If signals are received, the side-bands of which have different bandwidths, e.g. television signals, it is of advantage that the voltage arriving from the oscillator 3 has a phase-shift of 60° compared with the carrier 11 of the signal. Then the signal is demodulated in the mixer in the usual way by applying one edge of the passing curve and marked as Nyquist-demodulation. FIG. 4 shows this phase position indicated as *a* is the path around which the total vector of the signal 11, 12, 13 fluctuates at a pure amplitude-modulation. By adding the carrier 14 only the projection of the path *a*, viz the path *b* is of importance for the demodulation. For the frequencies contained only in one side-band only vector 12 is present, for example, the projection of this one rotating side-band vector also results in the path *b*. It is thus demonstrated that by the 60° phase shift of the oscillator voltage 14 a demodulation is obtained which corresponds in its effect to a Nyquist-demodulation without using selective means to produce a Nyquist-edge.

To prevent the auxiliary signal from interfering with the received signal it is of particular advantage to place said auxiliary signal in a part of the transmission spectrum which is used only slightly or not at all by the received signal. When transmitting speech this is a frequency above 3 kc./s., at the transmission of video signals it is, e.g. a frequency equal to the odd multiples of half of one of both deflection frequencies. If the horizontal deflection frequency is 15,625 kc./s. one may use for the auxiliary frequency e.g.

$$\frac{15{,}625}{2}\times 5=39{,}0625 \text{ kc./s.}$$

In order to obtain this frequency linkage with simple means the deflection frequency can be led via a small coupling capacitor to the auxiliary generator, oscillating at 39,0625 kc./s. By harmonic mixing a synchronization in the ratio 5:2 occurs in a sufficiently large frequency range.

In order to avoid the amplifier 4 being designed as a

D.C. voltage amplifier it can be designed in a known way as an A.C. voltage amplifier and the D.C. component of the video signal can be regained by a terminal circuit, known in the art. It is thereby suitable to differentiate the retrace pulses of the horizontal deflection to a double pulse and to use only the second part of said double pulse to terminate the rear pedestal or black porch of the video signal. To generate a control voltage to control the amplification of the video amplifier the synchronizing pulses of the terminating video signal can be rectified. In order to essentially increase the intersetting range of the synchronization of oscillator 3 when receiving television signals it is of particular advantage to use the discriminator of the audio-signal (5.5 mc./s. at CCJR-standard) simultaneously to produce a control voltage for the rough-tuning of oscillator 3. The control voltage of the discriminator is suitably added to the control voltage of the comparator circuit 8.

Figure 5:
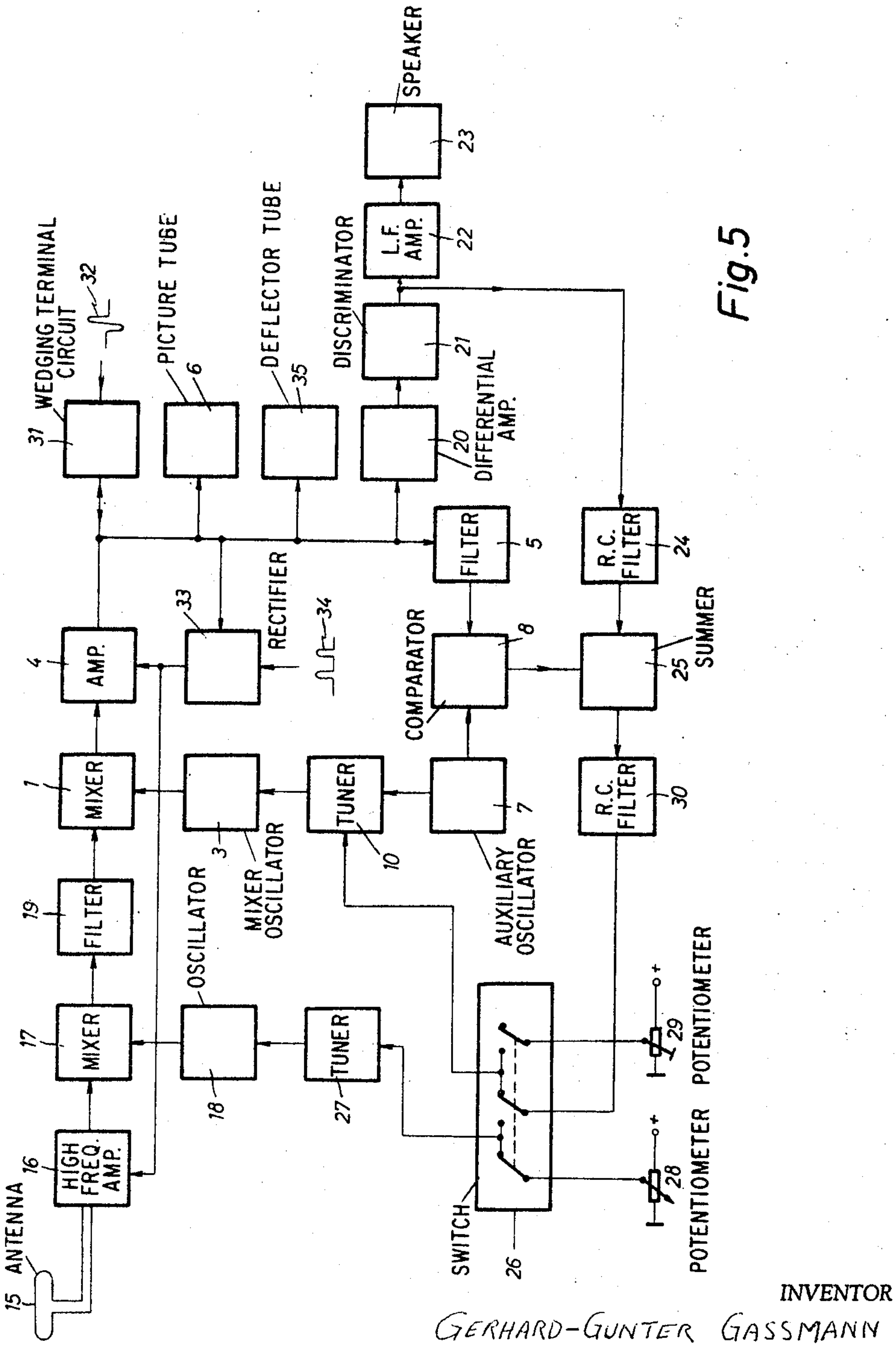

FIG. 5 shows the method described is advantageously applied to a television receiver. 15 represents the received antenna, the receiving signal of which is led to a tunable high-frequency amplifier 16. The amplified signal is brought to an intermediate frequency with the aid of the first mixer 17 in connection with the oscillator 18. Said intermediate frequency signal passes through a simple filter 19, consisting e.g. of a doublestage bandpass filter and a voice trap for adjacent audio-signals. Said filter 19 is designed so that a Nyquist-edge occurs at its center, where the nominal frequency of the image intermediate frequency carrier is located. The intermediate frequency signal leaving the filter 19 is led to the second mixer 1 in which it is synchronously demodulated. The video-signal leaving the mixer 1 is amplified in a multistage amplifier 4 and led to the picture tube 6. Moreover, an audio-differential signal (e.g. 5.5 mc./s. at CCJR-standard) is derived from the amplifier 4, amplified in a differential signal amplifier 20 and demodulated in the discriminator 21. This demodulated audio-signal is amplified in the low-frequency amplifier 22 and led to the lounspeaker 23. The auxiliary signal is derived from the amplifier 4 by means of a selective network 5 (e.g. with a transistor-attenuated R/C-network or with an oscillating circuit), and led to the comparing circuit 8 in which circuit said signal is compared with the auxiliary signal arriving from the generator 7. The control voltage, produced by the comparing circuit 8 is led to a summing circuit 25 to which is led in addition the control voltage, furnished by the discriminator 21 and filtered out in the R/C-filter network 24, in order to increase the signal intersecting range. This summing circuitry 25 may consist for example of a simple resistance matrix. It is also possible to add up both control voltages in the comparing circuit 8. The sum control voltages leaving the summing circuitry 25 or the comparing circuit 8, respectively, is filtered with an R/C-filter element 30 and led alternately through the switch 26 either to the tuning facility 10 of the oscillator 3 or to the tuning circuit 27 of the oscillator 18. The tuning circuit 10 also receives the auxiliary signal of the oscillator 7 for modulation of oscillator 3. A voltage is led to the tuning facility 27 via switch 21 in case when the sum control voltage is led to the tuning circuit 10, for tuning of oscillator 18; said voltage can be modified with the manual tuning potentiometer 28. In the switch position (shown on the drawing) it is possible to shift the intermediate frequency image carrier to the Nyquist-edge of filter 19. The sum control voltage thereby tunes the oscillator 3 with the aid of the tuning circuit 10. Thus synchronization is maintained and the audio signal can be demodulated as always that the center of the discriminator edge of discriminator 21. Although the intercarrier method is not applied and, consequently, no intercarrier hum occurs, the image carrier can be shifted to the Nyquist-edge by manual tuning without taking into account a shift of the audio-differential signal on the discriminator edge, as is the case for parallel audio-signal method. Further, where there is sufficient bandwidth of the synchronizing control circuit, an undesired frequency modulation of the oscillators 18 and/or 3, due to sound oscillations, is also prevented so that, as in the intercarrier method, no acoustic feedback can occur. If switch 26 is in the other position (not shown on the drawing) the sum control voltage is led to the tuning circuit 27 of oscillator 18 and the tuning circuit 10 of oscillator 3 receives a constant voltage so that the oscillator 3 oscillates on the frequency which shall be taken by the image intermediate frequency on the Nyquist-edge. Thereby, automatic precision tuning is obtained without additional means, as can only be obtained with standard receivers which include intermediate frequency amplifiers with attendant additional expenditure (image carrier decoupling circuit, amplifier, image carrier discriminator and control voltage amplifier). The video signal is led in a way known in the art to the amplitude filter and the deflection circuit 35 for the synchronization of both deflection generators.

Figure 6:
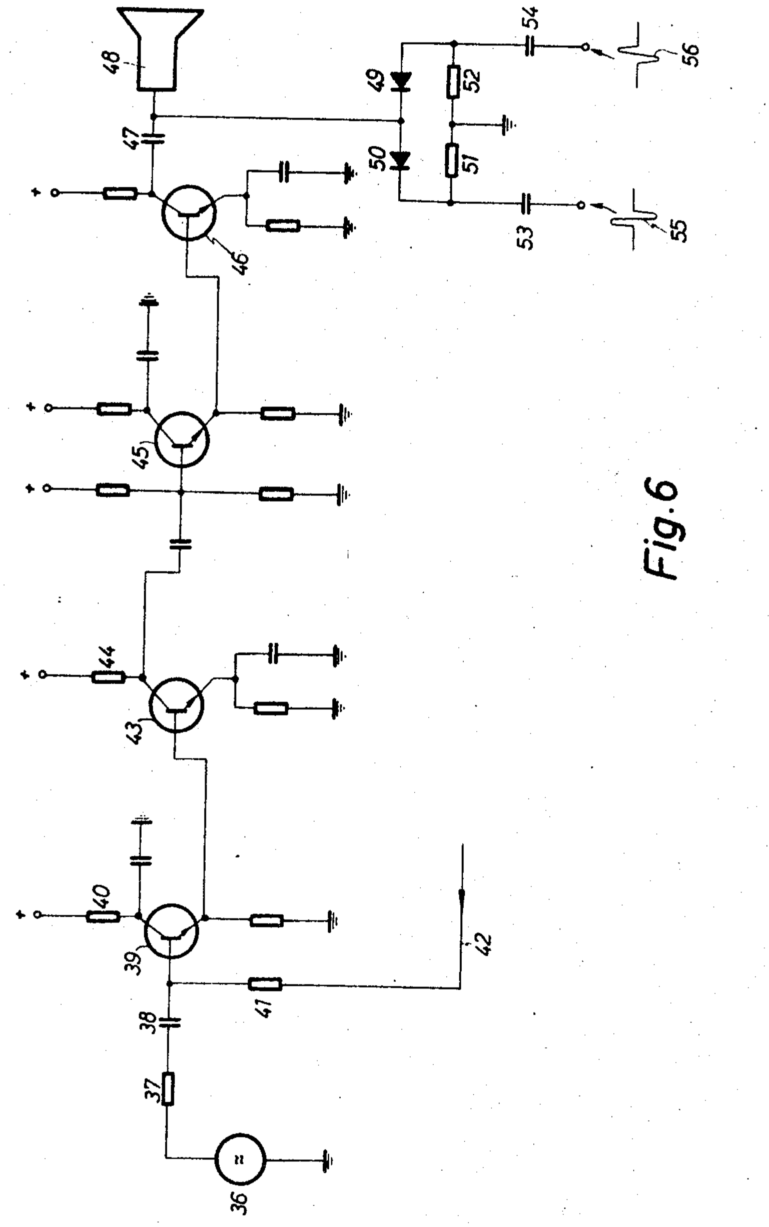

The video signal is wedged through the wedging terminal circuit 31 which receives additional wedging pulses 32. For a gain control of the video amplifier 4 and of RF amplifier 16 the synchronization pulses of the video signals are rectified in a rectifier circuit 33, actuated with the keying pulses 34; the thereby obtained control voltage is led, for example, to the first stage of the amplifier 4 and to the RF amplifier 16. This control voltage can also be led to the mixer stage 1. In a way known in the art the oscillator 3 and the mixer stage 1 can be combined to a self-oscillating mixer. In this case the mixer 1 cannot be controlled. In order to avoid over-excitation of the amplifier 4 in case of high input sequence it is recommended that a video amplification circuit as shown in FIG. 6 be used. In this figure 36 indicates the video voltage, furnished by the mixer 1, 37 represents the internal resistance, caused by the mixer 1; said internal resistance is generally identical with operating resistance of the mixer 1 along which the video voltage drops. This resistance 37 is for example 2–3 kc./s. The video signal is led to an emitter-base stage 39 via the coupling capacitor 38, said stage having a relatively high collector resistance 40. The stage 39 receives a positive control voltage 42 via the resistor 41. At an increasing control voltage the collector potential of the stage 39 drops to very low values. Thereby the current amplification of stage 39 drops considerably, moreover the input resistance of the stage 39 drops, too. Consequently during this operating condition the essential portion of the voltage 36 at the resistance 37 drops. Control of said stage therefore has a double effect, because at the correct Q-point the input resistance of the stage is higher than the resistance 37. From the emitter of stage 39 the video signal receives the base of stage 43, having again an external resistance 44 of approximately 2–3 kc./s. The second part of the video amplifier with the stages 45 and 46 operates in the same way as the first two stages, i.e. the stage 45 is an emitter base circuit and the stage 46, operating as video output stage, possesses a collector output. The video signal is led to the image tube 48 via the coupling capacitor 47. To regain the direct current voltage component the terminal circuit 49–54 is used to which terminal pulses 55 and 56 are led, said pulses being differentiated and having opposite polarity.

The method described with the aid of FIG. 1 can also advantageously be used for radio reception. It is thereby suitable to use as an auxiliary frequency for synchronization of the oscillator 3 such a frequency which is outside the frequency range of the base tones, i.e. larger than 4 kc./s., e.g. 7 kc./s. Thereby the auxiliary frequency can be kept off the loudspeaker without perceivable interference of the audio-signal through one or several filtering circuits. Also for radio reception the application of the twin superprinciple is suitable, in order to achieve that the oscillator 3 needs not to be tuned.

What is claimed is:

1. In a signal reception method the steps of:
locally generating a signal of the same frequency and phase as the carrier of the incoming signal,
modulating the locally generated signal with an auxiliary signal,
mixing the incoming signal with said modulated locally generated signal to cancel out the carrier frequency of said incoming signal, leaving solely a remnant auxiliary signal and the intelligence signal of the incoming signal,
separating said remnant auxiliary signal from the intelligence signal,
comparing the remnant auxiliary signal and the original auxiliary signal to provide a control signal proportional to the difference between said auxiliary and remnant auxiliary signals, and
controlling the frequency and phase of said locally generated signal with said control signal.

2. In a signal reception method according to claim 1 wherein said incoming signal is amplitude modulated and the locally generated signal is phase-modulated with said auxiliary signal.

3. In a signal reception method according to claim 1 wherein said incoming signal is a frequency modulated signal and said locally generated signal is amplitude modulated with said auxiliary signal.

4. In a signal reception method according to claim 1 wherein the frequency of said auxiliary signal is outside the spectrum of said incoming signal.

5. In a signal reception method according to claim 4 wherein said incoming signal is a television signal and the frequency of the auxiliary signal is an odd multiple of one-half of one of the two deflection frequencies of said television signal.

6. In a signal reception method according to claim 5 including the step of synchronizing said auxiliary signal with the horizontal deflection frequency of said video signal.

7. In a signal reception method according to claim 1 wherein the sidebands of said RF signal have different bandwidths, further including the step of phase shifting said locally generated signal 60° relative to the carrier of said incoming signal so as to obtain an equal-value demodulation of the modulation frequencies with respect to their amplitude.

8. A television receiver comprising:
means responsive to the incoming signal for forming an IF signal, said signal having a frequency equal to the difference between the frequencies of the image and audio carriers,
a first filter connected to the output of said responsive means for attenuating the adjacent audio carrier,
demodulating means connected to the output of said filter,
an auxiliary generator providing an auxiliary signal for phase modulating said demodulator,
an amplifier connected to the output of said demodulator for amplifying said video signal,
a second filter connected to the output of said amplifier for separating a remnant auxiliary signal from said video signal, and
a comparator circuit receiving said auxiliary signal furnished by said auxiliary generator and the remnant auxiliary signal recovered from said amplifier for providing a control signal used for frequency tuning said demodulator.

9. A television receiver according to claim 8 wherein said first filter forms a Nyquist-edge.

10. A television receiver according to claim 8 wherein said responsive means comprises a high frequency amplifier,
a mixer network connected to the output of the high frequency amplifier, and
a tuned oscillator providing the signal to said mixer.

11. A television receiver according to claim 8 including an audio circuit connected to the output of said amplifier.

12. A television receiver according to claim 11 wherein said audio circuit includes:
- a differential amplifier connected to the output of said amplifier, and
- a discriminator connected to the output of said differential amplifier.

13. A television receiver according to claim 12 wherein said demodulating means is further connected to the output of said discriminator and controlled by said output.

14. A television receiver according to claim 13 including a potentiometer for controlling said tuned oscillator.

15. A television receiver according to claim 8 wherein said amplifier is a four-stage transistorized video amplifier comprising,
- a first transistor, the base of which is capacitively coupled to the output of said demodulator,
- a second transistor, the base of which is connected to the emitter of said first transistor,
- a third transistor, the base of which is capacitively coupled to the collector of said second transistor,

- a fourth transistor, the base of which is connected to the emitter of said third transistor,
- output means capacitively coupled to the collector of said fourth transistor, and
- means connected to the base of said first transistor and dependent on the output value of the fourth transistor to control the gain of said first transistor.

References Cited

UNITED STATES PATENTS

| | | | |
|---|---|---|---|
| 2,231,704 | 2/1941 | Curtis | 325—444 XR |
| 3,057,954 | 10/1962 | Harling et al. | 178—7.3 |
| 3,144,512 | 8/1964 | McAllen et al. | 178—7.3 |

RICHARD MURRAY, *Primary Examiner.*

ROBERT L. RICHARDSON, *Assistant Examiner.*

U.S. Cl. X.R.

178—7.3; 325—444; 329—123